(12) United States Patent
Higeta

(10) Patent No.: US 8,847,990 B2
(45) Date of Patent: Sep. 30, 2014

(54) DISPLAY CONTROL APPARATUS FOR DISPLAYING IMAGE, DISPLAY CONTROL METHOD, PROGRAM AND STORAGE MEDIUM

(75) Inventor: Tatsuya Higeta, Hiratsuka (JP)

(73) Assignee: Canon Kabushiki Kaisha (JP)

(*) Notice: Subject to any disclaimer, the term of this patent is extended or adjusted under 35 U.S.C. 154(b) by 181 days.

(21) Appl. No.: 13/192,654

(22) Filed: Jul. 28, 2011

(65) Prior Publication Data

US 2012/0026193 A1 Feb. 2, 2012

(30) Foreign Application Priority Data

Jul. 28, 2010 (JP) ................................ 2010-169130
Jun. 24, 2011 (JP) ................................ 2011-140675

(51) Int. Cl.
*G09G 5/00* (2006.01)
*G06F 3/048* (2013.01)
*G11B 27/34* (2006.01)
*H04N 5/232* (2006.01)
*G11B 27/10* (2006.01)
*H04N 5/77* (2006.01)
*H04N 1/00* (2006.01)
*G06F 17/30* (2006.01)
*G11B 27/32* (2006.01)
*H04N 9/82* (2006.01)
*H04N 1/32* (2006.01)

(52) U.S. Cl.
CPC .............. *H04N 9/8227* (2013.01); *G11B 27/34* (2013.01); *H04N 2201/3214* (2013.01); *H04N 2201/3274* (2013.01); *H04N 5/23293* (2013.01); *G11B 27/105* (2013.01); *H04N 2201/0087* (2013.01); *H04N 5/77* (2013.01); *H04N 1/00453* (2013.01); *H04N 1/32101* (2013.01); *G06F 17/30274* (2013.01); *G11B 27/322* (2013.01); *H04N 2201/0089* (2013.01); *H04N 2201/3205* (2013.01); *H04N 2201/3253* (2013.01)
USPC ............................ 345/637; 345/635; 715/838

(58) Field of Classification Search
CPC .......... H04N 1/00458; H04N 1/00453; H04N 2201/3274; G06F 17/30696
USPC .......................................... 345/637; 715/838
See application file for complete search history.

(56) References Cited

U.S. PATENT DOCUMENTS 7,243,101 B2 * 7/2007 Itou ............................... 382/224
2006/0250419 A1 * 11/2006 Shiba et al. .................... 345/619

(Continued)

FOREIGN PATENT DOCUMENTS

CN 101226536 A 7/2008
JP 2001-231005 A 8/2001

OTHER PUBLICATIONS

CN Office Action issued Mar. 1, 2013 for corres. CN201110217032.3.

(Continued)

*Primary Examiner* — Kee M Tung
*Assistant Examiner* — Nicholas R Wilson
(74) *Attorney, Agent, or Firm* — Rossi, Kimms & McDowell LLP

(57) ABSTRACT

A display control apparatus that allows a user to easily find a desired image on a multi-display screen in a short time. Attribute information of images stored in a storage medium is read out. The images stored in the storage medium is classified into a plurality of groups on the basis of the read attribute information and arranged for each group on a multi-display screen which is controlled to be displayed on a display device. Display processing is controlled so that, when the multi-display screen is displayed, an image having the highest priority of the display processing in a first group having the highest priority of the display processing of the groups is displayed first, and then display processing of an image having the highest priority of the display processing in a second group of the groups.

15 Claims, 9 Drawing Sheets

(56) References Cited

U.S. PATENT DOCUMENTS

2008/0028308 A1  1/2008  Brownlee et al.
2009/0110300 A1* 4/2009  Kihara et al. ................. 382/224
2009/0185052 A1* 7/2009  Tokunaga ................. 348/231.3
2010/0077297 A1  3/2010  Hori

OTHER PUBLICATIONS

Chinese Office Action cited in Chinese counterpart application No. CN201110217032.3, dated Apr. 23, 2014. English translation provided.

* cited by examiner

FIG.3

| IMAGE NAMES | DATES (MONTH / DAY) |
|---|---|
| PIC1 | A / A |
| PIC2 | A / A |
| PIC3 | A / A |
| PIC4 | A / A |
| PIC5 | A / A |
| . . . | . . . |
| PIC33 | A / A |
| PIC34 | B / B |
| PIC35 | B / B |
| PIC36 | B / B |
| . . . | B / B |
| PIC62 | B / B |
| PIC63 | C / C |
| PIC64 | C / C |
| . . . | . . . |
| PIC94 | C / C |
| PIC95 | C / C |
| PIC96 | C / C |

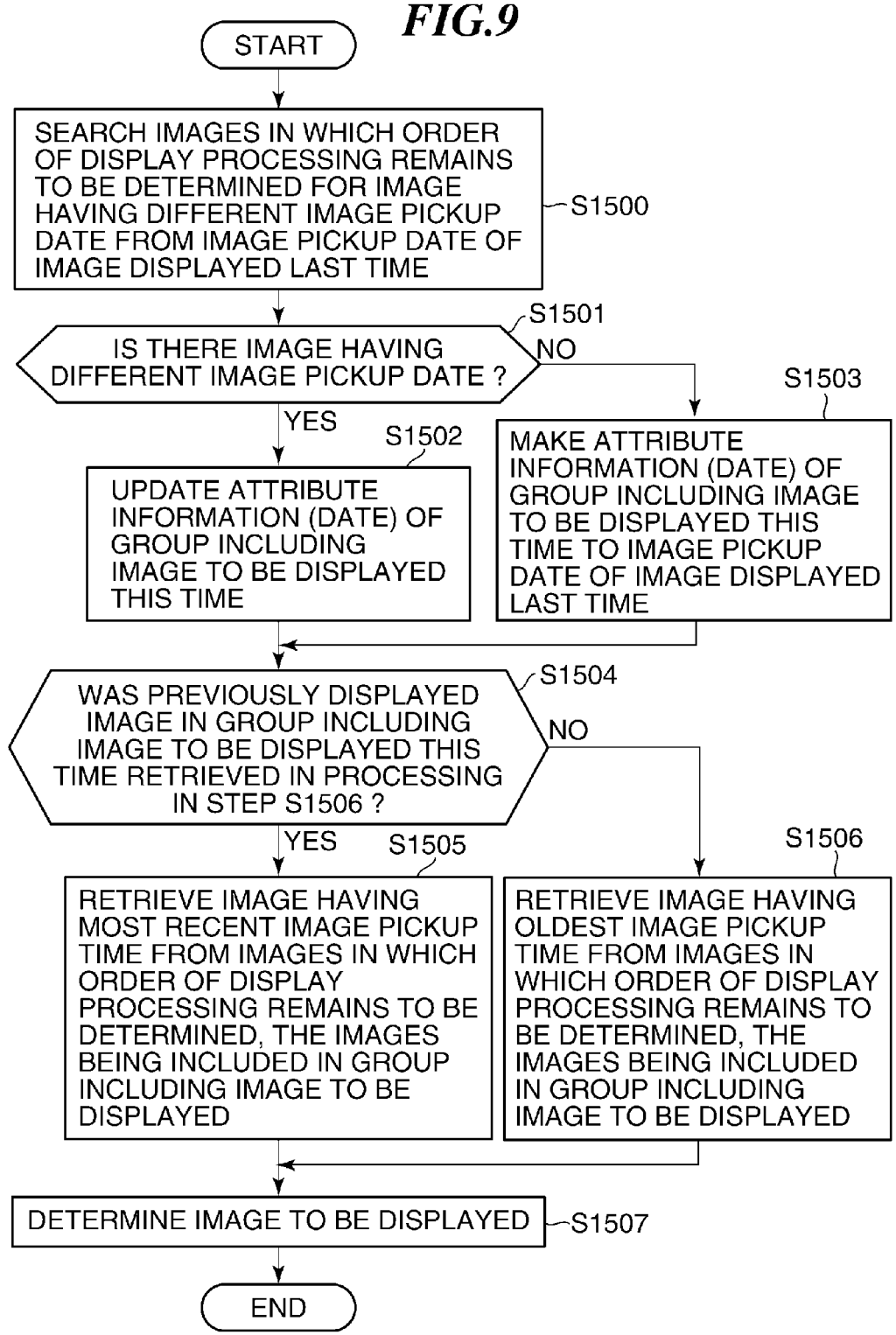

DISPLAY CONTROL APPARATUS FOR DISPLAYING IMAGE, DISPLAY CONTROL METHOD, PROGRAM AND STORAGE MEDIUM

BACKGROUND OF THE INVENTION

1. Field of the Invention

The present invention relates to a display control apparatus and a display control method for displaying images, a program used for the display control method, and a storage medium for storing the program.

2. Description of the Related Art

As an image display method adopted in liquid crystal displays of digital cameras, video cameras, and the like, a thumbnail display method is known. In this method, a screen is divided into a plurality of areas, in each of which an image (thumbnail) reduced either one of a still image and a representative image of a moving image which are recorded on a recording medium is placed. By viewing a multi-display screen displayed by the thumbnail display method, an operator can easily search from still images or moving images recorded on a recording medium for a desired image.

However, in such a thumbnail display method, because images are reduced in size one by one to create their thumbnails and the created thumbnails are sequentially displayed in areas on a screen, if the number of thumbnails to be displayed on one screen becomes large, the processing time required to complete the thumbnail display for one screen will be longer. Particularly, in recent years, recording media have increased in capacity and the number of recordable images has also increased, so that the number of reduced images to be displayed on one screen has been increasing. Thus, an efficient display method for eliminating the problem of longer time to display images is needed.

Therefore, Japanese Laid-Open Patent Publication (Kokai) No. 2001-231005 proposes a method for determining a thumbnail to be displayed first on a multi-display screen on the basis of an image being displayed on a screen or an operator's operation. For example, there is a method for, when a multi-display screen is started displaying, displaying images beginning with a thumbnail of an image that is displayed just before the multi-display screen is displayed.

However, in the technique disclosed in Japanese Laid-Open Patent Publication (Kokai) No. 2001-231005, although a thumbnail to be displayed first on a multi-display screen can be changed from a default thumbnail, once display of the multi-display screen starts, thumbnails are displayed in succession beginning with an image that a storage medium stores just after (or immediately before) an image first displayed as a thumbnail. Therefore, the larger the number of thumbnails to be displayed on one screen is, the longer the processing time becomes, so that disadvantageously, it takes time for an operator to grasp images on a multi-display screen.

In addition, for example, if the operator cannot find a desired image on the multi-display screen, since many thumbnails are displayed on the multi-display screen and then the screen goes to a next multi-display screen, it takes much longer time for the operator to grasp the images.

This problem arises also in a case where thumbnails are divided into groups and then displayed. That is, until all thumbnails in one group are displayed, any one of thumbnails in a next group is not displayed. Therefore, an operator cannot make an estimate of what images a group to be displayed next to the group being displayed includes, so that the operator cannot view the images efficiently.

SUMMARY OF THE INVENTION

The present invention provides a display control apparatus and a display control method that allows a user to easily find a desired image on a multi-display screen in a short time. The present invention also provides a program for causing a computer to implement the display control method, and a storage medium storing the program.

In a first aspect of the present invention, there is provided a display control apparatus comprising a reading unit configured to read out attribute information of images stored in a storage medium, a classification unit configured to classify the images stored in the storage medium into a plurality of groups on the basis of the attribute information read out by the reading unit, and a display control unit configured to control a multi-display screen on which the images of the groups classified by the classification unit are arranged for each group, to be displayed on a display device, wherein the display control unit controls display processing so that, when the multi-display screen is displayed, an image having the highest priority of the display processing in a first group having the highest priority of the display processing of the groups is displayed first, and then display processing of an image having the highest priority of the display processing in a second group of the groups, which has the second highest priority of the display processing, is next performed before an image having the second highest priority of the display processing in the first group is displayed.

According to the present invention, images are divided into groups on the basis of attribute information of the images, and in accordance with a priority of each group and priorities of images in each group, the images are displayed one by one. Thus, an operator can grasp what images are included in each group easily and quickly, so that even if there are a large number of thumbnails, the operator can easily grasp a position of a desired image on a multi-display screen in a short time.

The above and other objects, features, and advantages of the invention will become more apparent from the following detailed description taken in conjunction with the accompanying drawings.

BRIEF DESCRIPTION OF THE DRAWINGS

FIG. 3 is a data list of thumbnails to be displayed on one screen of a display section of the display control apparatus of FIG. 1.

FIG. 9 is a flow chart showing a procedure for determining the order of the thumbnail display processing according to the second embodiment, the display processing being shown in FIGS. 8A to 8C.

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

<Configuration of Display Control Apparatus>

Figure 1:
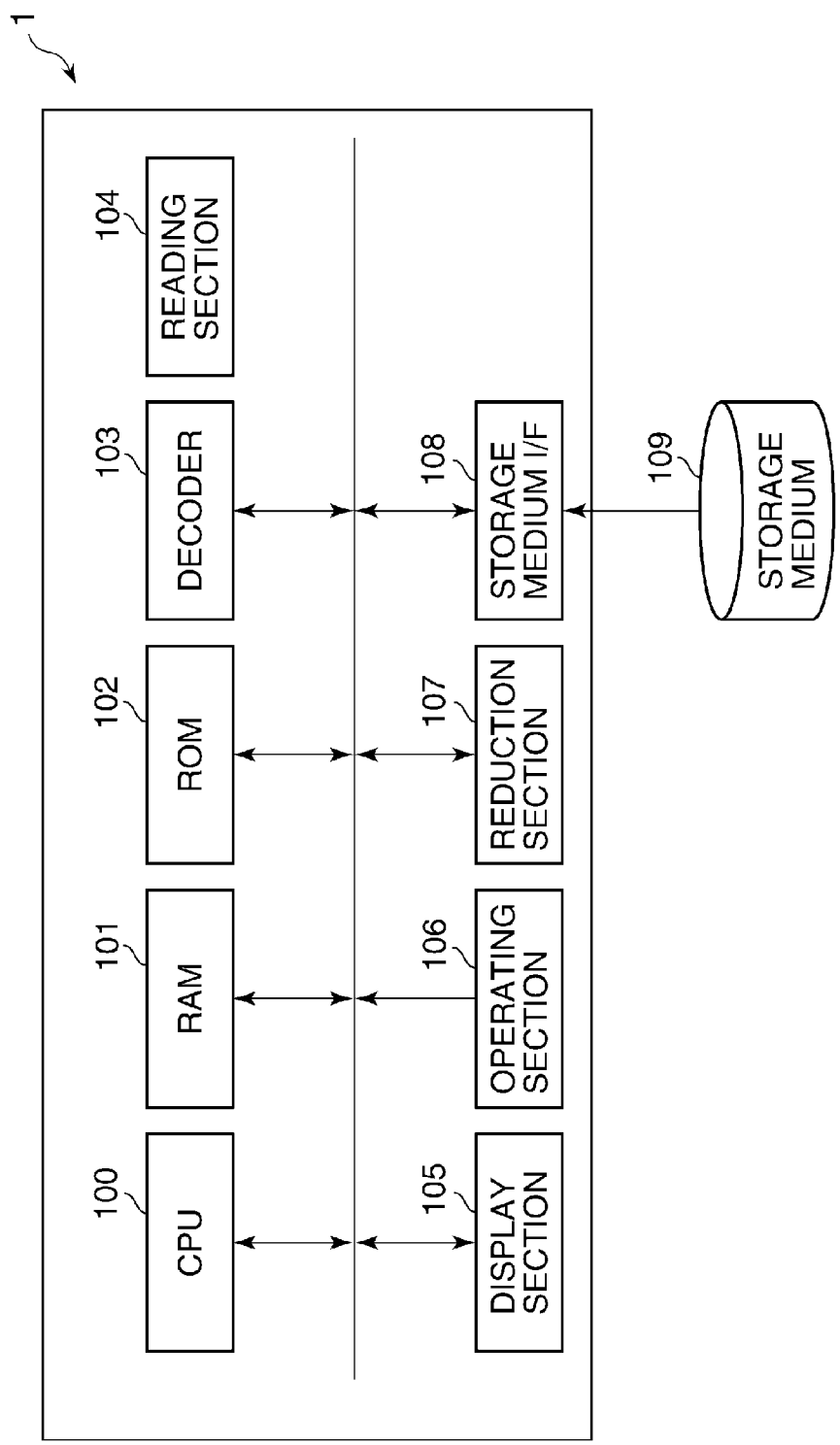
FIG. 1 is a block diagram showing a schematic configuration of a display control apparatus according to an embodiment of the present invention.

FIG. 1 is a block diagram showing a schematic configuration of a display control apparatus according to an embodiment of the present invention. In FIG. 1, a display control apparatus 1 includes a classification unit which classifies images by attribute information of the images, a determining unit which determines an order of the image display processing, and a central processing unit (CPU) 100 which includes a function to display reduced images in a multi-display manner and controls an operation of the entire display control apparatus 1.

Also, the display control apparatus 1 includes a RAM 101, a ROM 102, a decoder 103, a reading section 104, a display section 105, an operating section 106, a reduction section 107, and a storage medium I/F 108.

The RAM 101 is used as a work area of the CPU 100, a buffer area for image data, and the like. The ROM 102 stores a program and data for causing the CPU 100 to perform various types of processing accomplished by the display control apparatus 1. The decoder 103 decodes encoded image data to create image data. The reading section 104 reads out from a storage medium 109 encoded image data and attribute information of the image through the storage medium I/F 108.

The display section 105 includes a display panel such as an LCD and an OEL (organic electroluminescence) panel on which a multi-display screen is displayed. As described later, the display panel displays thumbnails in a multi-display manner, and thereby the operator can recognize the images stored in the storage medium 109. The operating section 106 includes various operation keys functioning as an interface between the display control apparatus 1 and the operator.

The reduction section 107 reduces the size of image data decoded by the decoder 103 to create a thumbnail. The storage medium I/F 108 is an interface for allowing data transfer between the storage medium 109 and the display control apparatus 1. The storage medium 109 can consist of an optical disk such as a DVD disk, a magnetic storage medium such as an HDD, and a semiconductor memory such as a flash memory.

<Display Control in Display Control Apparatus 1>

FIRST EMBODIMENT

The processing according to a first embodiment, the processing being performed in the display control apparatus 1, namely, a procedure executed by the CPU 100 will be described below with reference to FIGS. 2 to 5. Each piece of the processing performed in the display control apparatus 1 is achieved by the following flow: the CPU 100 loads a program stored in the ROM 102 into the RAM 101 and executes the program, and then each section of the display control apparatus 1 performs a predetermined operation.

It should be noted that in the display control apparatus 1, attribute information and priorities of images, which are used for dividing the images into groups (classification), are assumed to be set before the display of thumbnails starts. The setting may be performed by an operator operating the operating section 106 in a state in which a menu screen for performing various settings of the display control apparatus 1 is displayed. Alternatively, the attribute information and the priorities may also be set by default. In addition, one of a plurality of settings may be selected automatically according to an operation state of the display control apparatus 1.

Examples of combinations of the attribute information and the priorities of images, which are used for dividing the images into groups, include an image pickup date (attribute information) and the chronological order or the reverse chronological order of image pickup times (priority), an image pickup location (attribute information) and the order of the image pickup locations from north to south (priority), and photographers' names (attribute information) and the order of file name (priority). In the following description, it is assumed that the combination of an image pickup date (attribute information) and the chronological order of the image pickup times (priority) is used to divide images into groups.

Figure 2:
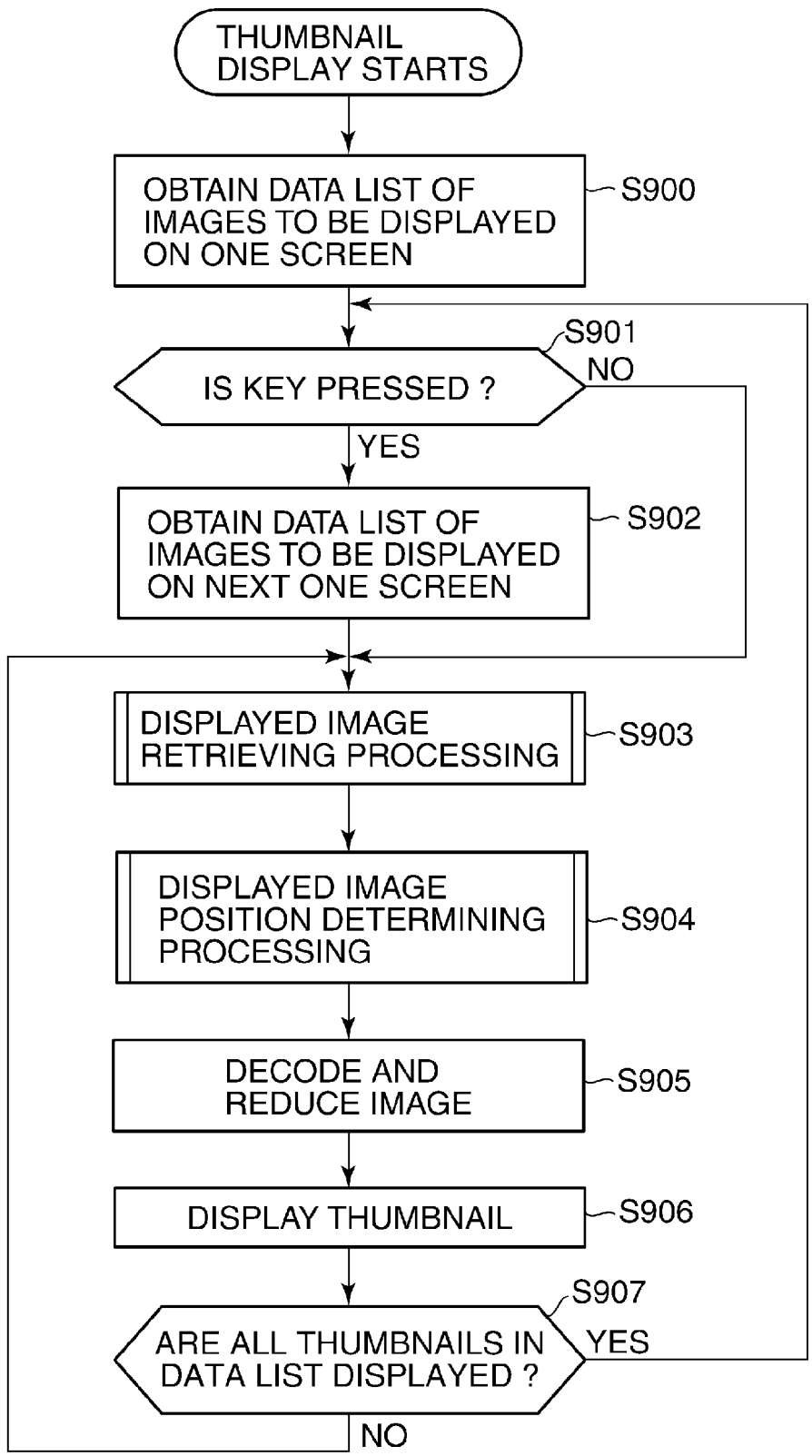
FIG. 2 is a flow chart showing a procedure for displaying thumbnails in the display control apparatus of FIG. 1.

FIG. 2 is a flow chart showing a procedure for displaying thumbnails in the display control apparatus 1 of FIG. 1. First, when the CPU 100 receives a command to start the display of thumbnails from the operating section 106 by an operator operating the operating section 106, the CPU 100 causes the reading section 104 to read out names of all images to be displayed on one screen (one page) from images stored in the storage medium 109 as well as image pickup dates (attribute information) of the images. The CPU 100 creates a data list from the read-out information and then stores the created data list into the RAM 101 (step S900). It should be noted that the processing in step S900 is performed by obtaining and analyzing attribute information of header parts without decoding the encoded image data of main bodies of the images stored in the storage medium 109. The data list will be described later in detail with reference to FIG. 3.

Then, the CPU 100 determines whether or not the operating section 106 receives key entry to turn a page of a multi-display screen and the like (step S901). The page turning of a multi-display screen will be described later with reference to FIG. 6. If the key entry is received ("yes" in S901), the process proceeds to step S902. On the other hand, if the key entry is not received ("no" in S901), the process proceeds to step S903.

In step S902, names of all the images (thumbnails) to be displayed on a next one screen (next page) of the display section 105 and image pickup dates thereof are read out from the storage medium 109, and a data list of the images is created and stored by overwriting a data list in the RAM 101. Then, the process proceeds to step S903.

In step S903, the CPU 100 retrieves an image having the highest priority of the display processing order from non-displayed images in the data list based on attribute information of the images, thereby determining the image in which the display processing should be performed this time (hereinafter, referred to as an image to be displayed). A procedure for retrieving an image to be displayed will be described later in detail with reference to FIG. 4.

After step S903, the CPU 100 determines a display position on the screen at which the image is to be displayed (step S904), causes the reading section 104 to read out encoded image data of the image to be displayed from the storage medium 109, and stores the read-out encoded image data into the RAM 101. A procedure for determining a display position on the screen at which the image is to be displayed will be described later in detail with reference to FIG. 5.

Thereafter, the encoded image data stored in the RAM 101 is decoded by the decoder 103, the resultant image data is stored in the RAM 101, and the reduction section 107 reduces the size of the image data stored in the RAM 101 to create a thumbnail (step S905). It should be noted that the thumbnail of step S905 may also be created by decoding the encoded image data only. The created thumbnail is displayed on the display section 105 in accordance with its display position (step S906), and then it is determined whether or not thumbnails of all the images in the data list have been displayed (step S907).

If there is a thumbnail that is not displayed ("no" in S907), the process returns to step S903 and performs the same processing again. On the other hand, if the thumbnails of all the images are displayed ("yes" in S907), the process returns to step S901 and waits for key entry.

It should be noted that although not specifically shown in FIG. 2, if key entry is received after each of steps S902 to S906 or during each of steps S900 and S902 to S907, the process proceeds to step S902 without starting the process in the next step or maintaining the process in the present step.

FIG. 3 is a data list of thumbnails to be displayed on one screen (one page) of the display section 105 of the display control apparatus 1 in FIG. 1. Here, it is assumed that one screen displays 96 thumbnails. Thus the data list includes data of 96 images. In the data list of the first embodiment, data required to identify encoded image data of one thumbnail and a priority of the image data is an image name, an image pickup date set as the attribute information for grouping, and image pickup time, not shown, set as the attribute information for determining an order of displayed images.

In the data list, the images are divided into groups by using image pickup dates set as the attribute information for grouping, and the groups are listed in the order of descending priorities of the image pickup dates. In the data list of FIG. 3, the images are listed from top to bottom in the chronological order of the image pickup dates and times.

A plurality of images having the same image pickup date may be ordered based on subordinate information of the attribute information set for grouping as well as may be ordered based on a criterion other than the attribute information set for grouping. In the embodiment, the attribute information set for grouping is the image pickup dates, so image pickup time is included as the subordinate information, thus the images in the same date group are listed in the chronological order of the image pickup times. However, the images shot in the same image pickup data may also be listed in the order of file names, which are a criterion different from the attribute information used for the grouping.

In the following description, it is assumed that a plurality of images shot in the same image pickup date are listed in the chronological order of image pickup times. It should be noted that because numbers included in the file names are assigned in the chronological order of the image pickup dates and times, in the data list shown in FIG. 3, the images shot in the same image pickup date are listed in the chronological order of the image pickup times as well as in ascending order of the numbers included in the file names. The order of the data list is an order of the display positions of the thumbnails displayed on one screen of the display section 105.

It is assumed that in a multi-display screen in which images are arranged in a matrix with n rows and m columns, the order of the display positions of the thumbnails starts at the uppermost left end and goes to the right end through the same raw, and from the second uppermost left end to the right end, and so on. Meanwhile, the order in which the display processing of the thumbnails is performed (the order of the display processing) is different from the order shown in the data list and determined according to the processing described below with reference to FIGS. 4 and 5.

Figure 4:
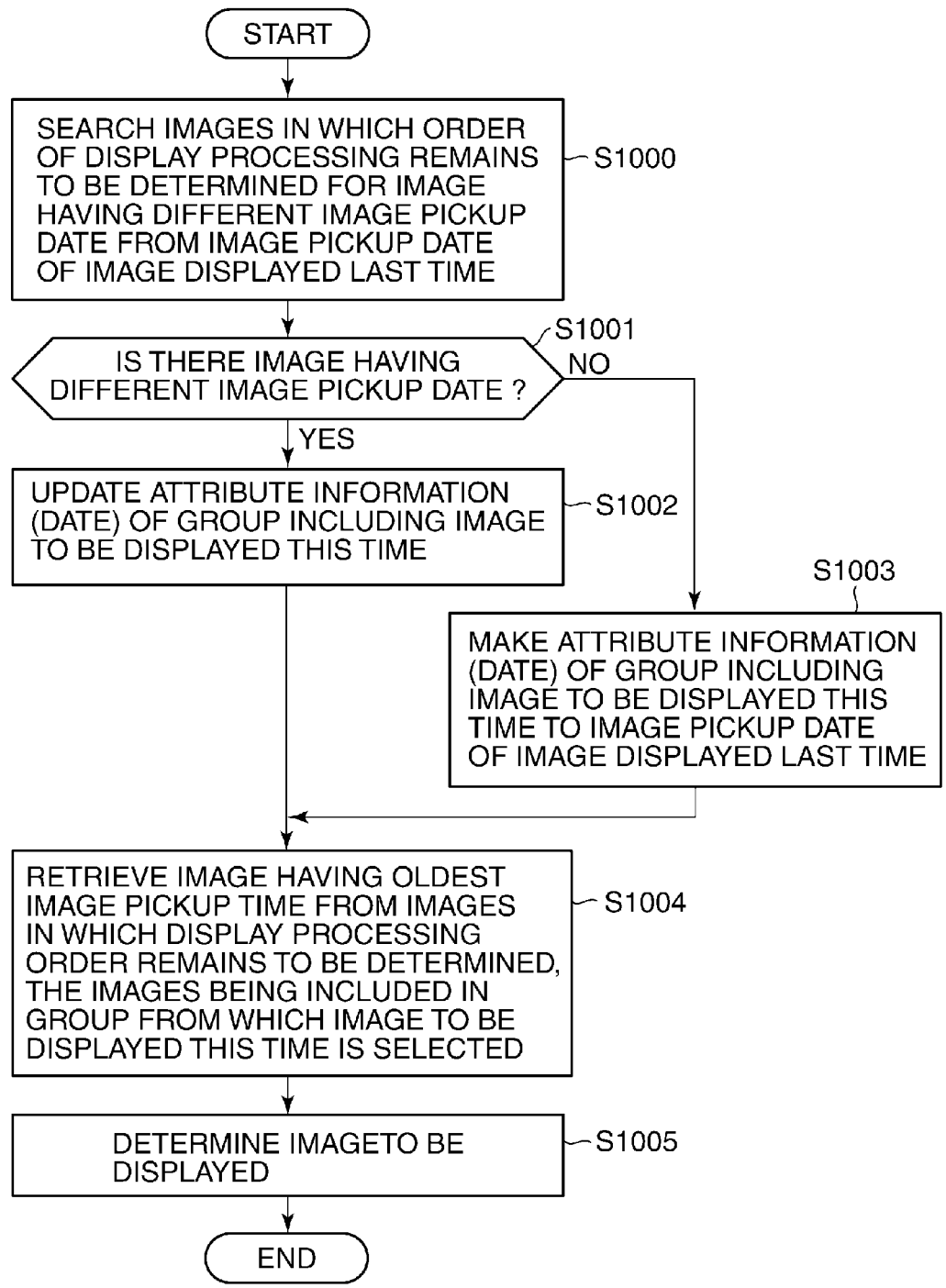
FIG. 4 is a flow chart showing a procedure for retrieving and determining an image to be displayed from non-displayed images in the data list, the procedure being implemented in step S903 of FIG. 2.

FIG. 4 is a flow chart showing a procedure for retrieving and determining an image to be displayed from non-displayed images in the data list, the procedure being implemented in step S903 of FIG. 2. In other words, this processing may be considered as processing for retrieving an image having the highest priority of the display processing from the non-displayed images in the data list.

First, the CPU 100 searches, among the images in the data list for which the order of the display processing remains to be determined, for an image having a different image pickup date from the image pickup date of the image displayed last time (step S1000), and then the CPU 100 determines whether or not there is the image having the different image pickup date (step S1001).

If it is determined that there is the image having the different image pickup date ("yes" in step S1001), attribute information of a group including an image to be displayed this time is updated to the image pickup date of this image having the different image pickup date (step S1002). Thereafter, the process proceeds to step S1004. On the other hand, if there is no images having the different image pickup date ("no" in step S1001), the attribute information (date) of the group including the image to be displayed this time is made to be the image pickup date of the image displayed last time (step S1003). Thereafter, the process proceeds to step S1004.

In step S1004, the CPU 100 retrieves an image having the oldest image pickup time from the images in which the display processing order remains to be determined, the images being included in the group from which the image to be displayed this time is selected. Thereafter, the image retrieved in step S1004 is determined to be the image to be displayed (step S1005), and then the process proceeds to end.

It should be noted that although not specifically shown in FIG. 4, if the image displayed last time is included in the last group in the data list, the image to be displayed this time is retrieved from the first group in the data list.

Figure 5:
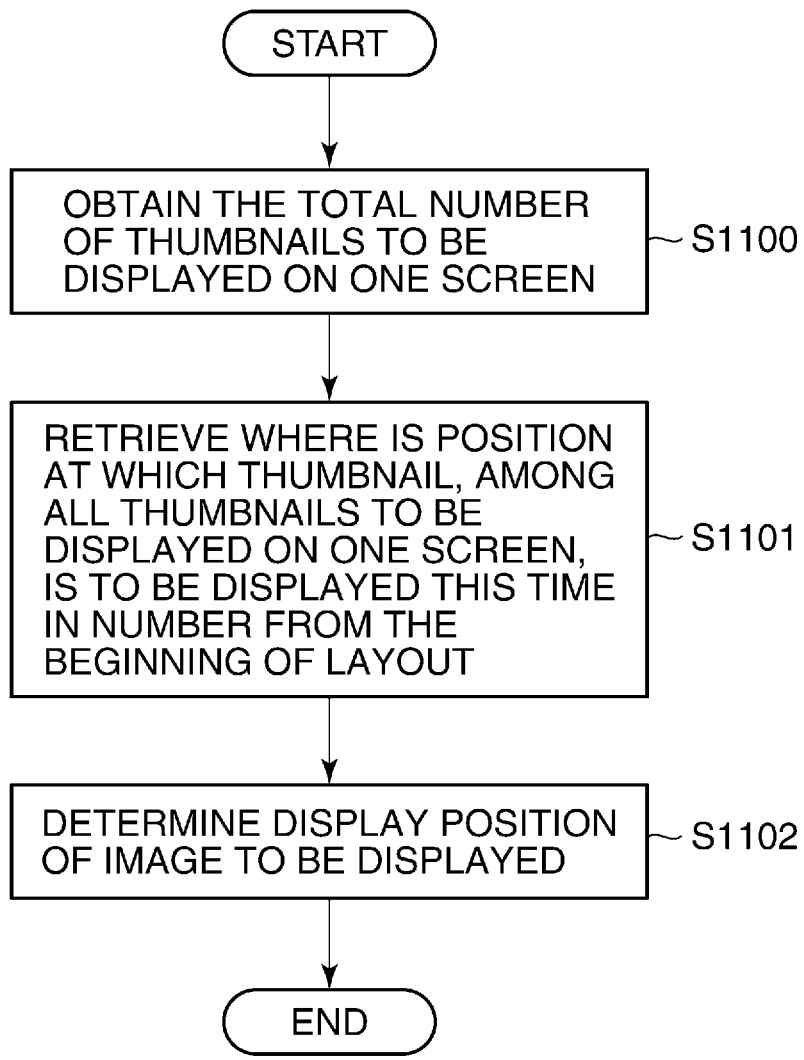
FIG. 5 is a flow chart showing a procedure for determining a display position on the screen at which the image to be displayed that is determined on the basis of the flow chart of FIG. 4, the procedure being implemented in step S904 of FIG. 2.

FIG. 5 is a flow chart showing a procedure for determining a display position on the screen at which the image to be displayed that is determined on the basis of the flow chart of FIG. 4, the procedure being implemented in step S904 of FIG. 2.

First, the CPU 100 obtains from the data list the total number of the thumbnails to be displayed on one screen of the display section 105 (step S1100). On the basis of the obtained total number of the thumbnails to be displayed on the screen, layout of images to be displayed on the screen is determined. For example, if the total number is 96, the layout can be determined to be a matrix with 8 rows and 12 columns. If the total number is 36, the layout can be determined to be a matrix with 6 rows and 6 columns. The layout is determined in this manner, then the display position of the image to be displayed could be determined if it were determined which position the image to be displayed should be put at from the beginning position of the layout. Thus, by using the data list, the CPU 100 determines, in all the thumbnails to be displayed on one screen, the number of images between the beginning of the data list and the image that is to be displayed and is determined in step S1005 (see FIG. 4) (step S1101). In accordance with the determined number of images, the display position of the image to be displayed this time is determined (step S1102), and the process proceeds to end.

It should be noted that the display position of the image to be displayed this time is determined by determining in advance areas in which the thumbnails are displayed and placing the thumbnails in the areas beginning with the uppermost left end in succession to the right end in the same row, and then from the second uppermost left end to the right end in the same row, and so on. Also, if layout of the thumbnails (8 rows and 12 columns or 6 rows and 6 columns) is determined in advance, the processing in S1100 shown in FIG. 5 is not necessary.

Next, the above-mentioned display processing of the thumbnails will be described with reference to FIG. 6 and FIGS. 7A to 7E, in which a specific example of the thumbnails displayed on the display section 105 is shown.

Figure 6:
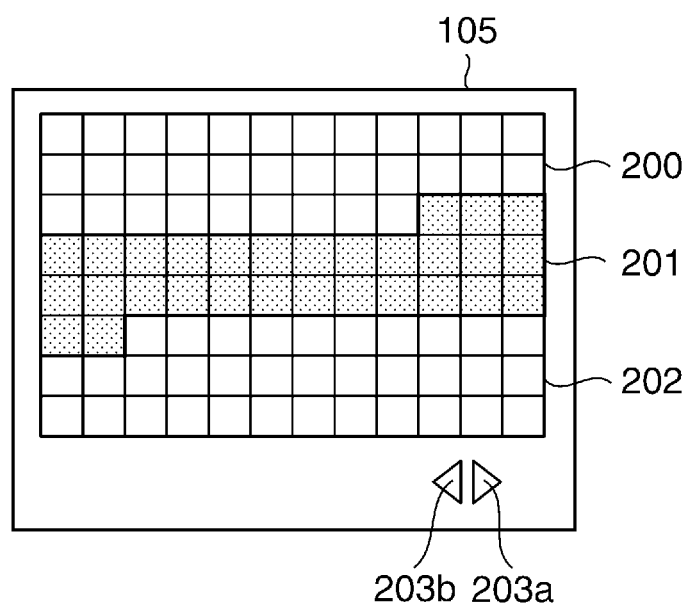
FIG. 6 is a diagram showing an example of a state in which all thumbnails are displayed on one screen of the display section of FIG. 1.

FIG. 6 is a diagram showing an example of a state in which all thumbnails are displayed on one screen of the display section 105 of FIG. 1. In the display section 105, 96 display positions composed of 8 rows and 12 columns, thus the display positions which configure a multi-display screen on which 96 thumbnails can be displayed.

In FIG. 6, thumbnails of 33 images shot in a certain day are displayed in a first area 200 as one group, thumbnails of 29 images shot in another day are displayed in a second area 201 as one group, and thumbnails of 34 images shot in yet another day are displayed in a third area 202 as one group.

It should be noted that in FIG. 6, the multi-display screen of the display section 105 displays thumbnails of images of three days, but the present invention is not limited thereto. That is, if the storage medium 109 stores images of four or more days, the number of areas can be set according to the days.

In FIG. 6, the display section 105 shows bold lines superimposed on the borders of each of the first area 200, the second area 201, and the third area 202, which enables an operator to easily grasp that three groups are being displayed on the display section 105. That is, referring to the multi-display screen, the operator can identify to which group a thumbnail of a certain image belongs. However, such border representation is not necessary.

The display section 105 displays page turning buttons composed of a right arrow button 203a and a left arrow button 203b. If the right arrow button 203a is operated, next 96 thumbnails that follow the 96 thumbnails being displayed are displayed on the display section 105. That is, the multi-display screen goes to the next screen (page). On the other hand, if the left arrow button 203b is operated, previous 96 thumbnails followed by the 96 thumbnails being displayed are displayed on the display section 105. That is, the multi-display screen returns to the previous screen (page).

The operations of the right arrow button 203a and the left arrow button 203b may be performed through a touch panel as well as may be performed with buttons to which each of the right arrow button 203a and the left arrow button 203b is assigned. If the right arrow button 203a or the left arrow button 203b is pressed during the thumbnails are being sequentially displayed, the display of the thumbnails on the present multi-display screen is ended and thumbnail displaying starts on a turned next/previous multi-display screen.

FIGS. 7A to 7E are diagrams showing the order of the thumbnail display processing according to the first embodiment, the processing leading to the state of the displayed thumbnails shown in FIG. 6. Numbers shown in FIGS. 7A to 7E denote the order of the thumbnail display processing. Also, in FIGS. 7A to 7E, border representation for the first area 200, the second area 201, and the third area 202 as shown in FIG. 6 is omitted.

Figure 7A:
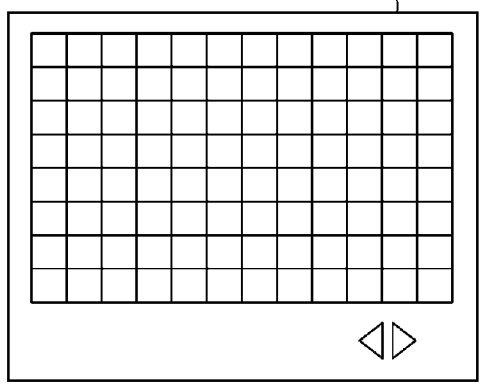
FIGS. 7A to 7E are diagrams showing the order of thumbnail display processing according to a first embodiment, the processing leading to the state of the displayed thumbnails shown in FIG. 6.

FIG. 7A shows a pre-display state, so that no thumbnails are displayed. When the display of thumbnails onto the display section 105 starts, the state shown in FIG. 7A shifts to a state shown in FIG. 7B.

Figure 7B:
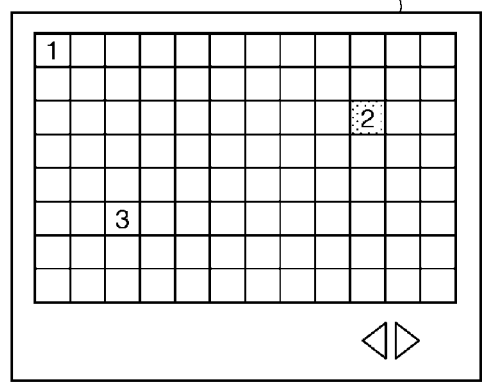

FIG. 7B shows a state in which first three thumbnails are displayed. One is displayed as a first thumbnail (number 1) of the 33 thumbnails displayed in the first area 200 in FIG. 6. Next, another is displayed as a first thumbnail (number 2) of the 29 thumbnails displayed in the second area 201 in FIG. 6. Then, yet another is displayed as a first thumbnail (number 3) of the 34 thumbnails displayed in the third area 202 in FIG. 6. That is, in each group corresponding to each area, the display starts with a thumbnail having the highest priority. It should be noted that the numbers shown in this figure are not image file names but numbers indicating the chronological order of timings at which the display processing starts (the order of the display processing).

Figure 7C:
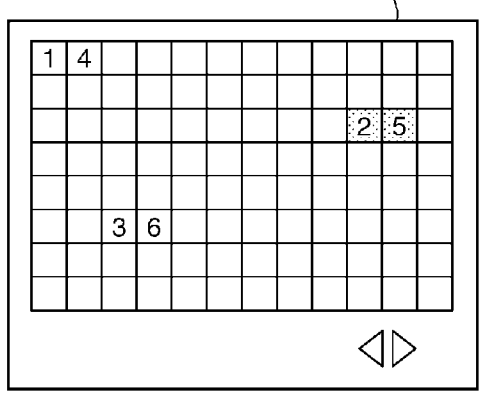

FIG. 7C shows a state in which next three thumbnails following the three thumbnails shown in FIG. 7B are displayed. A second thumbnail (number 4) of the 33 thumbnails to be displayed in the first area 200 is displayed, and then a second thumbnail (number 5) of the 29 thumbnails to be displayed in the second area 201 is displayed. Then, a second thumbnail (number 6) of the 34 thumbnails to be displayed in the third area 202 is displayed.

Figure 7D:
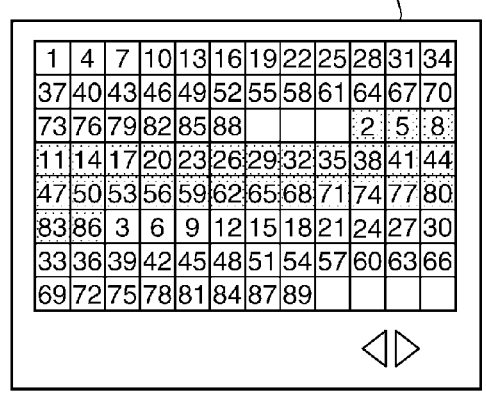
Figure 7E:
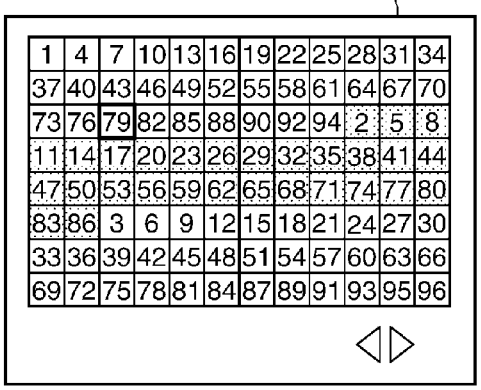

FIG. 7D shows a state in which thumbnails are further displayed on the state shown in FIG. 7C and the 29 thumbnails have been displayed in the second area 201. FIG. 7E shows a state in which all the thumbnails have been displayed.

A 29th (last) thumbnail in the second area 201 is displayed 86th, so that a 29th thumbnail in the third area 202 is displayed 87th, and a 30th thumbnail in the first area 200 is displayed 88th. Since there is not a 30th thumbnail to be displayed in the second area 201, a 30th thumbnail in the third area 202 is displayed 89th.

Thereafter, thumbnails are displayed one by one alternately in the first area 200 and the third area 202, and when a 94th thumbnail is displayed in the first area 200, the display of the thumbnails in the first area 200 is completed. In this state, since two thumbnails remain to be displayed in the third area 202, 95th and 96th thumbnails are displayed in the third area 202 in a row, and all the thumbnails have been displayed.

Thus, in the first embodiment, a first thumbnail for each area is displayed in succession in order of priority, then a second reduced image (thumbnail) for each area is displayed in succession in order of priority, and so on, that is, in each area, each reduced image is displayed in succession in order of priority. In other words, when a multi-display screen is displayed, once an image having the highest priority of the display processing in the first group is displayed, prior to an image having the second highest priority of the display processing in the first group, an image having the highest priority of the display processing in another group having a lower priority than the first group is controlled to be displayed. Also, in other words, on the basis of the attribute information of each image, in the display processing for one screen of the multi-display screen, after the display processing of a first image (e.g., an image of the first thumbnail (number 1) in FIG. 7C) starts, the display processing of a second image (e.g., an image of the second thumbnail (number 2) in FIG. 7C) in which particular attribute information (in the embodiment, the image pickup dates) is different from that of the first image is controlled to start before a third image (an image of the fourth thumbnail (number 4) in FIG. 7C) in which the particular attribute information (the image pickup dates) is same as the first image and the display position is closer to the first image than the second image. That is, even if specific grouping is not performed based on the attribute information, the display control such as described in the embodiment can be achieved. Alternatively, more plainly, it may be achieved by simply performing the control described below. In the display processing for one screen of a multi-display screen in which a plurality of images are arranged in the screen in a predetermined order, after the display processing of a first image (e.g., an image of the first thumbnail (number 1) in FIG. 7C) starts, the display processing of a second image (e.g., an image of the second thumbnail (number 2) in FIG. 7C) is controlled to start before a third image (an image of the fourth thumbnail (number 4) in FIG. 7C) in which the display position is closer to the first image than the second image. Simply by such a scheme, the advantage of the present application can be provided, namely, summary of the display for one screen can be understood before the display of all the images to be displayed on the screen is completed, which allows an operator to judge whether to turn a page.

According to the first embodiment described above, even if thumbnails of all the images in a group are not displayed, the operator of the display control apparatus 1 can judge which group is being displayed by seeing some thumbnails in each group. This enables the operator to make an estimate of whether or not a desired image is included in a multi-display screen that is being displayed.

As a result, if the operator estimates that the multi-display screen on which the thumbnails are being displayed sequentially does not have the desired image, the operator may switch the display to a next multi-display screen by pressing the right arrow button 203*a* before the multi-display screen has displayed the thumbnails of all the images. That is, the operator can quickly invoke the multi-display screen which displays the desired image to search for the desired image.

It should be noted that in the first embodiment, the images are divided into the groups by using the image pickup dates, but the present invention is not restricted thereto, and images may be divided into groups by using any type of information such as event information, camera information, face information, position information, angle of view information, image name information, and image folder information, as long as the information can be used to classify the images. Because these types of information may be used by simply changing date conditions of images used in the first embodiment, the detailed description about this is omitted.

To determine one image from the thumbnails displayed on the display section 105, if the display section 105 has a touch panel, a desired image may be touched, or a button (not shown) such as a four-direction button installed in the operating section 106 may be used for the determination.

In FIG. 7E, a cursor (selection frame) indicating a thumbnail being selected is superimposed on an outline of the thumbnail denoted by the number 79. When the four-direction button is used, for example, if a right arrow on the button is pressed, usually the selected position moves from the thumbnail being selected to its immediate right thumbnail, so that in the case of FIG. 7E, the cursor moves from the thumbnail of the number 79 to the thumbnail of the number 82.

However, the present invention is not restricted thereto, for example, when a right arrow on the four-direction button is pressed, the selection may move to the thumbnail of the number 80, which is displayed next to the thumbnail of the number 79 being selected (i.e., move in order of the display processing). By using such a cursor moving method, if the number of thumbnails to be displayed on one screen of the display section 105 is large, the position of a desired image can be found quickly.

SECOND EMBODIMENT

In a second embodiment, a method applied to the display control apparatus 1 according to this embodiment will be described, and the method comprises displaying images having the same image pickup date alternately in the order of an image of old image pickup time, an image of recent image pickup time, and then an image of old image pickup time. That is, this is an example in which an image having the highest display processing priority in a group is an image having the oldest image pickup time in the group, and an image having the second highest display processing priority is an image having the most recent image pickup time in the group. It is assumed that the setting described for the first embodiment with reference to FIG. 6 is also applied to the second embodiment. Furthermore, as with the first embodiment, it is assumed that 33 thumbnails are displayed in the first area 200, 29 thumbnails are displayed in the second area 201, and 34 thumbnails are displayed in the third area 202.

Figure 8A:
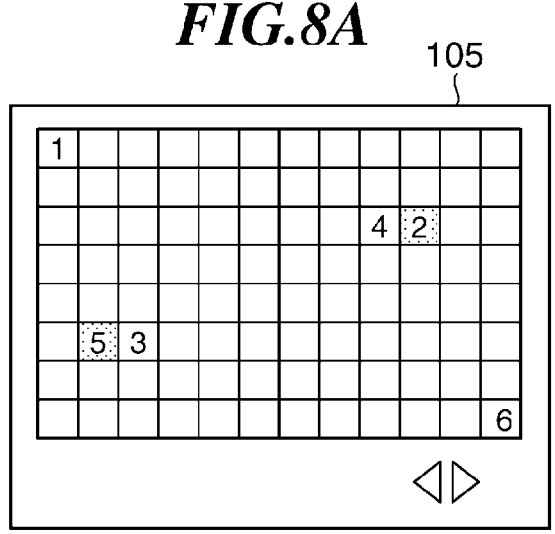
FIGS. 8A to 8C are diagrams showing the order of thumbnail display processing according to a second embodiment, the processing leading to the state of the displayed thumbnails shown in FIG. 6.
Figure 8B:
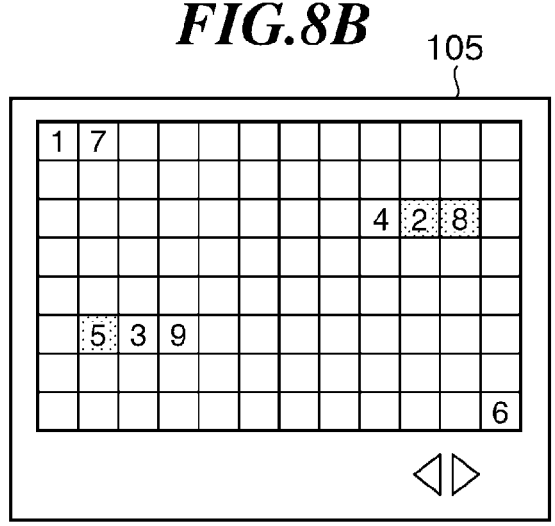
Figure 8C:
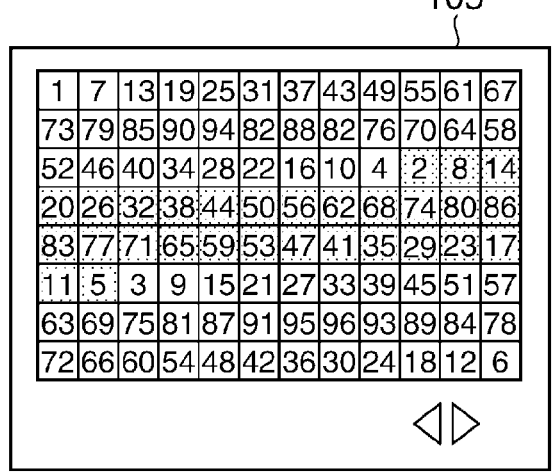

FIGS. 8A to 8C are diagrams showing the order of thumbnail display processing according to the second embodiment, the processing leading to the state of the displayed thumbnails shown in FIG. 6. The numbers shown in FIGS. 8A to 8C indicate the order of the thumbnail display processing.

FIG. 8A shows a state in which six thumbnails are displayed. First, as a first thumbnail of the 33 thumbnails in the first area 200, the first thumbnail (number 1) having the oldest image pickup time is displayed. Second, also as a first thumbnail of the 29 thumbnails in the second area 201, the first thumbnail (number 2) having the oldest image pickup time is displayed. Third, also as a first thumbnail of the 34 thumbnails in the third area 202, the first thumbnail (number 3) having the oldest image pickup time is displayed.

Fourth, the 33rd thumbnail (number 4) having the most recent image pickup time from the 33 thumbnails displayed in the first area 200 is displayed. Fifth, similarly, the 29th thumbnail (number 5) having the most recent image pickup time from the 29 thumbnails displayed in the second area 201 is displayed; sixth, the 34th thumbnail (number 6) having the most recent image pickup time from the 34 thumbnails displayed in the third area 202 is displayed.

FIG. 8B shows a state in which nine thumbnails have been displayed. Seventh, the thumbnail (number 7) having the second oldest image pickup time from the 33 thumbnails in the first area 200 is displayed. Eighth, similarly, the thumbnail (number 8) having the second oldest image pickup time from the 29 thumbnails in the second area 201 is displayed; ninth, the thumbnail (number 9) having the second oldest image pickup time from the 34 thumbnails in the third area 202 is displayed. In this manner, thumbnails having the same image pickup date are displayed alternately in chronological order, reverse chronological order, and chronological order of image pickup times. Finally, all the thumbnails are displayed in the order of the numbers shown in FIG. 8C.

To achieve the thumbnail display method according to the second embodiment, the procedure for determining the order of the thumbnail display processing in the first embodiment described above may be modified.

FIG. 9 is a flow chart showing a procedure for determining the order of the thumbnail display processing according to the second embodiment, the display processing being shown in FIGS. 8A to 8C. Because steps S1500 to S1503 and step S1507 shown in FIG. 9 are same as steps S1000 to S1003 and step S1005 shown in FIG. 4, steps S1504 to S1506, which are different from the steps in FIG. 4, are now described. Also, as is the case with the processing in FIG. 4, although not specifically shown in FIG. 9, if the image displayed last time is included in the last group in the data list, the image to be displayed this time is retrieved from the first group in the data list.

When, in step S1502 or step S1503, the attribute information (date) of the group including an image to be displayed this time is determined, it is determined whether or not the just previously displayed image in the group including the image to be displayed this time was retrieved in the processing in step S1506 described later (step S1504). It should be noted that if an image is first displayed in the group including the image to be displayed this time, since there is no previously displayed image in the group including the image to be displayed this time, in step S1504, it is determined that retrieval in step S1506 was not performed, and the processing proceeds to step S1506.

As a result of the determination made in step S1504, if the previous retrieval was performed in step S1506 ("yes" in step S1504), the processing proceeds to step S1505; if the previous retrieval was not performed in step S1506 ("no" in step S1504), the processing proceeds to step S1506.

In step S1505, the CPU 100 retrieves an image having the most recent image pickup time from the images in which the order of the display processing remains to be determined, the images being included in the group including the image to be displayed this time, and then the process proceeds to step S1507. On the other hand, in step S1506, the CPU 100 retrieves an image having the oldest image pickup time from the images in which the order of the display processing remains to be determined, the images being included in the group including the image to be displayed this time, and then the process proceeds to step S1507.

According to the second embodiment, the same advantage as the first embodiment described above is provided. That is, even if all images included in a group are not displayed, an operator of the display control apparatus 1 can judge which group is being displayed by seeing some images in each group to switch to a multi-display screen on which a desired image is displayed.

OTHER EMBODIMENT

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium. In this case, the program code itself read from the storage medium realizes the functions of any of the embodiments described above, and hence the program code and the storage medium in which the program code is stored constitute the present invention.

Also, in the embodiment described above, the CPU 100, which is a piece of hardware, controls the entire display control apparatus 1, but a plurality of pieces of hardware may control the entire display control apparatus 1 by the pieces of hardware sharing the processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

Also, the display control apparatus 1 according to the present invention can be applied to an apparatus that can display a plurality of images at the same time; for example, a personal computer, a digital camera, a PDA, a cell phone handset, a mobile image viewer, a display installed in a printer and used to select and check a print image, and a digital photo frame.

This application claims the benefit of Japanese Patent Application No. 2010-169130, filed Jul. 28, 2010 and Japanese Patent Application No. 2011-140675, filed Jun. 24, 2011, which are hereby incorporated by reference herein in their entirety.

What is claimed is:

1. A display control apparatus comprising:
a reading unit configured to read out attribute information of images stored in a storage medium;
a classification unit configured to classify the images stored in the storage medium into a plurality of groups on the basis of the attribute information read out by said reading unit, the plurality of groups including a first group and a second group; and
a display control unit configured to control a multi-display screen on which the images of the groups classified by said classification unit are arranged for each group, to be displayed on a display device;
wherein said display control unit controls display processing on the multi-display screen so as
to display a first image among images classified into the first group,
to display a third image among images classified into the second group, after displaying the first image,
to display, among the images classified into the first group, a second image at a position next to the first image after displaying the third image, wherein the first image is higher in priority than the second image, and
to display, among the images classified into the second group, a fourth image at a position next to the third image after displaying the second image, wherein the third image is higher in priority than the fourth image.

2. The display control apparatus as claimed in claim 1, wherein the image attribute information is at least any of date information, event information, camera information, face information, position information, angle of view information, image name information, and image folder information.

3. The display control apparatus as claimed in claim 1, wherein a priority of the display processing of an image included in one of the groups depends on image pickup time of the image in the group.

4. The display control apparatus as claimed in claim 1, wherein an image displayed first in one of the groups is an image having an oldest image pickup time in the group, and an image displayed next in the group is an image having a most recent image pickup time in the group.

5. The display control apparatus as claimed in claim 1, wherein said display control unit further distinguishably displays each display area of the groups arranged in the multi-display screen.

6. The display control apparatus as claimed in claim 1, further comprising an operation unit including an operation key for receiving an operation by an operator,
wherein said display control unit stops the display processing of all the images to be displayed on the multi-display screen if an instruction to switch the multi-display screen to a next multi-display screen is received through the operation key before the display processing of all the images to be displayed on the multi-display screen being displayed is completed, and said display control unit starts display processing of all images to be displayed on the next multi-display screen.

7. The display control apparatus as claimed in claim 1, further comprising an operation unit including an operation key for receiving an operation by an operator, wherein said display control unit displays on the multi-display screen a selection frame for selection of one image from the images displayed on the multi-display screen, and moves the selection frame in the same order as the order of the display processing of the images displayed on said display device when a user instruction to move the selection frame is received through the operation key.

8. The display control apparatus as claimed in claim 1, wherein the display processing includes at least one of processing for decoding an encoded image stored in the storage medium and processing for further scaling the decoded image.

9. The display control apparatus as claimed in claim 1, wherein said display control unit is configured to control the multi-display screen so that after displaying the image having the highest priority of the display processing in the second group, the image having the second highest priority of the display processing in the first group is displayed, without user operation, together with the image having the highest priority of the display processing in the first group and the image having the highest priority of the display processing in the second group.

10. A non-transitory computer-readable storage medium storing a program for causing a computer to function as each unit of the display control apparatus as claimed in claim 1.

11. A method for controlling a display control apparatus, the method comprising:
 a reading step of reading out attribute information of images stored in a storage medium;
 a classification step of classifying the images stored in the storage medium into a plurality of groups on the basis of the attribute information read out in said reading step, the plurality of groups including a first group and a second group; and
 a display control step of controlling a multi-display screen on which the images of the groups classified in said classification step are arranged for each group, to be displayed on a display device;
 wherein display processing is controlled in said display control step on the multi-display screen so as to display a first image among images classified into the first group,
 to display a third image among images classified into the second group, after displaying the first image,
 to display, among the images classified into the first group, a second image at a position next to the first image after displaying the third image, wherein the first image is higher in priority than the second image, and
 to display, among the images classified into the second group, a fourth image at a position next to the third image after displaying the second image, wherein the third image is higher in priority than the fourth image.

12. A display control apparatus that displays on a display device a multi-display screen in which a plurality of images are arranged in one screen in a predetermined order, the apparatus comprising:
 a reading unit configured to read out attribute information assigned to each image, the attribute information including first attribute information and second attribute information; and
 a display control unit configured, on the basis of the attribute information of each image read out by said reading unit, in display processing for one screen of the multi-display screen,
 to display a first image among images to which the first attribute information is assigned,
 to display a third image among images to which the second attribute information is assigned, after displaying the first image,
 to display, among the images to which the first attribute information is assigned, a second image at a position next to the first image after displaying the third image, wherein the first image is higher in priority than the second image, and
 to display, among the images to which the second attribute information is assigned, a fourth image at a position next to the third image after displaying the second image, wherein the third image is higher in priority than the fourth image.

13. The display control apparatus as claimed in claim 12, wherein the display control unit is configured to control the multi-display screen so that after displaying the second image, the third image is displayed, without user operation, together with the first image and the second image.

14. A non-transitory computer-readable storage medium storing a program for causing a computer to function as each unit of the display control apparatus as claimed in claim 12.

15. A method for controlling a display control apparatus that displays on a display device a multi-display screen in which a plurality of images are arranged in one screen in a predetermined order, the method comprising:
 a reading step of reading out attribute information assigned to each image, the attribute information including first attribute information and second attribute information; and
 a display control step of, on the basis of the attribute information of each image read out in said reading step, in display processing for one screen of the multi-display screen
 to display a first image among images to which the first attribute information is assigned,
 to display a third image among images to which the second attribute information is assigned, after displaying the first image,
 to display, among the images to which the first attribute information is assigned, a second image at a position next to the first image after displaying the third image, wherein the first image is higher in priority than the second image.

* * * * *